(12) United States Patent
Karlsson

(10) Patent No.: US 6,215,773 B1
(45) Date of Patent: Apr. 10, 2001

(54) METHOD TO CONTROL A SWITCHING UNIT AND AN ARRANGEMENT WORKING ACCORDING TO THE METHOD

(75) Inventor: Carl Michael Karlsson, Årsta (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 0 days.

(21) Appl. No.: 09/014,395

(22) Filed: Jan. 27, 1998

(30) Foreign Application Priority Data

Jan. 27, 1997 (SE) .................................................. 97 00219

(51) Int. Cl.$^7$ .................................. H04L 1/24; H04J 3/14
(52) U.S. Cl. ............................................. 370/244; 370/370
(58) Field of Search ..................................... 370/241, 244, 370/250, 251, 369, 370, 373, 375, 377, 468

(56) References Cited

U.S. PATENT DOCUMENTS

| | | |
|---|---|---|
| 2,647,166 | 7/1953 | Lens . |
| 3,711,670 | 1/1973 | Deitsch . |
| 4,048,445 | 9/1977 | Ghisler . |
| 4,532,624 | 7/1985 | Renner . |
| 4,704,716 | 11/1987 | Bowers et al. . |
| 5,214,400 | 5/1993 | Roos . |

FOREIGN PATENT DOCUMENTS

| | | |
|---|---|---|
| 0152974 | 8/1985 | (EP) . |
| 6-62480 | 3/1994 | (JP) . |

*Primary Examiner*—Melvin Marcelo
(74) *Attorney, Agent, or Firm*—Burns, Doane, Swecker & Mathis LLP

(57) ABSTRACT

The present invention relates to a method and arrangement to control an established wideband connection through a switching unit regarding frame integrity of the time slots. The invention is suitable to be used in a switching unit of TST-structure. A first counter, related to respective input selector stage, counts incoming data frames. This first counter cycles through a predetermined number of states, where one state is a control-state. Each time slot belonging to the wideband connection to be tested is given a control mark during one of the control-states. A second counter, related to respective output selector stage, counts outgoing data frames. The second counter cycles through the same number of states as the first counter. Marked time slots are detectable by respective output selector stage. The state of the second counter and the output channel number of the control marked time slot is stored as a marked time slot is detected. The wideband connection to be tested is regarded correctly established through the switching unit if the time slots belonging to the wideband connection are all detected during a mutually same state of the second counter.

18 Claims, 3 Drawing Sheets

METHOD TO CONTROL A SWITCHING UNIT AND AN ARRANGEMENT WORKING ACCORDING TO THE METHOD

TECHNICAL FIELD

The present invention relates mainly to a method intended to control an established wideband connection through a switching unit.

The method relates to switching units comprising at least one input selector stage and at least one output selector stage. These selector stages can consist of time selector stages and/or space selector stages, depending on the structure or configuration of the switching unit. It can also be that one or several selector stages are working between the input and output selector stages. At least one of the categories input or output selector stages, or at least one of eventual there between working selector stages, consist of a time selector stage.

The information coming in to an input selector stage are represented by digital databits, arranged into incoming time slots within data frames, where one incoming time slot corresponds to one incoming channel with a specific channel number. Outgoing information from an output selector stage is accordingly represented by digital databits, arranged into outgoing time slots within data frames, where one outgoing time slot corresponds to one outgoing channel with a specific channel number.

A wideband connection is defined by a connection which holds two or more time slots within one data frame.

The present invention also relates to an arrangement adapted to work according to the method.

DESCRIPTION OF THE BACKGROUND ART

Information carrying databits, or user data, which is connected through a switching unit belongs to channels, so called connections. User data belonging to each connection from respective input in the switching unit is, within the switching unit, connected to a respective selectable output in the switching unit.

A technology used in these applications is circuit connecting. A frequently occurring selector structure at circuit connections is called "Time Space time" (TST). Several time selector stages are, in switching units with this structure, connected to one space selector stage. User data is first connected through an input time selector stage, then through the space selector stage, and finally through an output time selector stage.

User data from several connections which is to be connected through a switching unit with a TST-structure is multiplexed together through time-multiplexing. The user data is, through the time-multiplexing, placed into time slots which are arranged into frames. In the connection of the user data through the switching unit it is moved between different time slots and frames. This is done by delaying the user data in memories within the time selector stages.

User data coming into an input time selector stage appear in so called incoming time slots. User data coming out from output time selector stages are positioned within so called outgoing time slots.

The function of the switching unit is controlled, whereby disturbances are identified. Measures are made to remove the disturbances, and to thus regain a faultless function for the switching unit.

One form of control is a so called parity control. Parity bits are generated both on the basis of user data appearing in incoming time slots, and on the basis of user data appearing in outgoing time slots. One parity bit is generated for each incoming time slot and one parity bit is generated for each outgoing time slot. The parity bits belonging to incoming time slots are positioned in direct connection with the user data within the time slots, one parity bit for each time slot, and is then connected through the switching unit together with the user data. The parity bits of the incoming time slots are then compared with the parity bits of the outgoing time slots.

Thus are parity bits which are generated on the basis of the user data before it is connected through the switching unit compared with parity bits which are generated on the basis of a the user data after it has been connected through the switching unit. If there is a difference then the user data probably has been altered on its way through the switching unit, and there is some kind of disturbance.

Another form of control is a so called through connection test (TCT). Through a through connection test it is controlled that a connection through a switching unit is correctly set. Parity bits are used in this control as well.

One or more parity bits, generated based on user data appearing in incoming time slots belonging to the connection, are given reversed parity. These parity bits with reversed parity are positioned in connection with the user data within the incoming time slots and are connected through the switching unit together with the user data. Consequently are parity bits with reversed parity to appear in outgoing time slots belonging to the connection.

If the connection is set up in an erroneous way then these parity bits with reversed parity will appear either in outgoing time slots not belonging to the connection in question or else they will not appear at all.

At a throughput of user data belonging to a connection which occupies several time slots in each frame, a so called wideband connection, it is important that the user data is not changed in their order of time but that the internal order of time is maintained.

This is achieved by placing user data, belonging to a wideband connection, appearing in incoming time slots within a mutual frame, firstly within the same mutual order of time in the outgoing time slots and secondly within a mutual frame.

Sequence integrity, meaning integrity regarding the mutual sequence order of the time slots within a data frame (Time slot Sequence Integrity, TSSI), and frame integrity, meaning the integrity of the time slots regarding their belonging to a mutual data frame, (Time slot Frame Integrity, TSFI), is thus achieved.

A disturbance in the function of a switching unit may result in that user data, belonging to a wideband connection which is connected through the switching unit, and which appears in incoming time slots belonging to a mutual frame, is placed in outgoing time slots belonging to mutually different frames, with the result of lacking TSFI.

The following publications describes part of prior art within this area:

U.S. Pat. No. 4,048,445

This publication describes a TST switch, where parity bits are used to perform a through connection test (TCT). Incorrect parity is inserted with user data to the input in question immediately after the connection is establishes whereafter the outlets of the switch are checked to determine what output/s that are having incorrect parity.

A comparison is done between the the output/s having incorrect parity with the intended output/s. A simple circuit arrangement for distinguishing deliberately introduced wrong parity from through connection faults is also disclosed.

EP-A1-0 152 974

This publication describes a system in which the parity of many bit groups must be checked. These bit groups are checked simultaneously and jointly. The parity bits generated by parity generators are interchanged crosswise, are combined with the parity bits contained in the bit groups and applied to a common output. The checking circuit itself is checked by inverting one of the parity generators periodically.

JP-A-6 62480

This publication describes a time division type switch wherein the error of double write or a failure in write to time slots is monitored. At the input of the switch the parity is inverted with respect to a number of arbitrary time slots in a frame. At the output of the switch the inverted parity bits are detected and counted.

A comparison is performed with the number of arbitrary selected time slots in the frame, wherethrough an error is determined. The intraframe inversion position is changed in every frame to perform confirmation for all time slots.

U.S. Pat. No. 4,532,624

This publication describes a circuitry for validating the integrity of user data, in the form of PCM data, transmitted through a digital switching network is shown. The space stage of the switching system requires that appropriate data validity be maintained throughout. A parity scheme is employed to fulfill this requirement.

For detection of invalid parity, an alarm notification is sent to the central processing unit (CPU) of the switching system.

The CPU may then interrogate the space switching circuitry to determine the particular location of the parity failure. In addition, the circuitry provides for a testing feature, such that, the operation of the parity checking circuits may be validated.

U.S. Pat. No. 4,704,716

This publication describes a control of a wideband connection established through a TST-switching network. Additional buffer memories are added to the initial and final stages of the time-space-time switching network to insure that all the data received in one time frame from a given facility segment is assembled only into the same time frame for transmission on an outgoing facility segment.

SUMMARY OF THE INVENTION

TECHNICAL PROBLEMS

Taking prior art under consideration, as previously described, it is a technical problem to provide a method and/or an arrangement wherethrough TSFI for a wideband connection can be controlled in a simple and cost-effective way.

It is further a technical problem to present a method which provides the possibility to control that a number of channels, belonging to a mutual incoming data frame, are kept together through a switching unit and ends up in the same outgoing data frame, without the need of using various buffers where user data is buffered, with the exception for buffers traditionally used within a switching unit.

It is a technical problem to realize how a method is to provide a possibility to control the various time slots belonging to a wideband connection each for itself and yet provide a possibility to control TSFI.

It is a technical problem not only to label time slots belonging to a specific wideband connection but also to provide a possibility to control how a labeled time slot within one data frame belongs to the same wideband connection as an other labeled time slot within an other data frame.

It must then also be regarded as a technical problem to be able to realize how the possibilities to make use of traditional parity control, and for instance reversed parity to label time slots, can be supplemented in a simple way with further information, which makes it possible to control TSFI, even when each channel within a wideband connection is controlled separately.

It is thus a technical problem to be able to realize how this further information is to be provided without loading the transmission capacity through the switching unit with this further information.

It is a technical problem to realize how to limit the control in order to provide an adequate control of a wideband connection without unnecessarily limiting the transmission capacity.

It is also a technical problem to realize how a TSFI control of a wideband connection, where each channel belonging to the connection, is controlled separately from the others and where no further information accompanies respective time slot than a labeling of the time slot, such as through reversed parity, is to be provided with consideration taken to the time lag of the time slots that the switching unit itself constitutes between the input selector stage and the output selector stage.

It is a technical problem to be able to realize the specific advantages that the present invention brings with itself as it is applied to a switching unit, or selector structure, that starts and ends with a time selector stage, such as a TST-structure.

It is a technical problem to be able to realize how the regular parity control is to be managed while a TSFI control is performed and where the parity control is a part of the TSFI control.

It must also be regarded as a technical problem to be able to realize how to design an arrangement which is to function in accordance with a method according to the present invention.

It is a technical problem to be able to realize that a counter, which counts incoming data frames to an input selector stage, which counts through a predetermined number of states, and which allows a labeling of a time slot at only one of these states, in coaction with a counter, which counts outgoing time frames, from an output selector stage, and which counts through the same predetermined number of states, can provide a possibility to perform a TSFI control of a wideband connection where respective channel is controlled separately.

It is further a technical problem to be able to realize how to adapt an output selector stage to determine TSFI for a wideband connection on the basis of the results from the separately controlled channels.

It is a further technical problem to be able to realize how to adapt a central unit, belonging to the switching unit, into taking into consideration and into controlling a method according to the present invention.

SOLUTION

The present invention is based on a method used to control an established wideband connection through a switching unit, where the switching unit comprises at least one input selector stage and at least one output selector stage, such as time selector stages and/or space selector stages.

This method relates to switching units working in an environment where the information coming in to an input selector stage is represented by digital databits, arranged into incoming time slots within data frames, where one incoming time slot corresponds to one incoming channel with a specific channel number, and where outgoing information from an output selector stage is accordingly represented by digital databits, arranged into outgoing time slots within data frames, where one outgoing time slot corresponds to one outgoing channel with a specific channel number.

A wideband connection is defined by a connection which holds two or more time slots within one data frame.

With the basis of such a switching unit, and with the intention of solving one or more of the previously described technical problems, the present invention teaches a specific method where incoming data frames are counted or numbered by a first counting unit, related to the input selector stage. This first counter is cycled through a predetermined number of states, where one state constitutes a so called control state.

Each and every time slot belonging to a wideband connection is, according to the present invention, labeled with a control label during one of the control states. This provides the knowledge that labeled time slots can only occur within data frames that occurs with a certain predetermined periodicity, which information is crucial to a method according to the present invention, and which information does not require any transmission capacity through the switching unit.

Outgoing data frames are counted by a second counter, which is related to the output selector stages. This second counter is cycled through the same number of states as the first counter.

Each and every incoming data frame corresponds thus to one of the states in the counter sequence of the first counter, and each and every outgoing data frame corresponds to one of the states in the counter sequence of the second counter.

The labeled time slots are detectable by respective output selector stage, and, as a labeled time slot is detected, the output channel number of the labeled time slot and the state of the second counter is stored.

The wideband connection can be regarded as correctly established through the switching unit if labeled time slots belonging to the wideband connection are detected during a mutually same state of the second counter, and if every other time slot, belonging to other connections or channels, is unlabeled during the control, since labeled time slots only can occur with a certain periodicity.

The present invention teaches that, in order to provide a simple and effective possibility to label certain time slots, and in those cases where the transmission of information through the switching unit comprises a continuing parity control of the content of transmitted time slots, according to a predetermined order, the labeling of a time slot is performed by giving the information within the specific time slot a parity that deviates from the parity according to the predetermined order, such as reversed parity.

It is further shown that a detection of labeled time slots is only performed at a requested control of an established wideband connection, in order to thereby allow the regular parity control work undisturbed during the remaining transmission through the switching unit.

The present invention teaches that, in order to provide a possibility to perform a control of a wideband connection in a fast and effective manner, the time required for the first and second counter to cycle through the number of possible states is to correspond to at least the longest possible time that can be required from the point in time where the information within a time slot is received in an input selector stage to the point in time where it is transmitted from an output selector stage.

A method according to the present invention provides the possibility to allow a control of a wideband connection to be performed in one time slot per data frame, where the result from respective control is compared with one another to control that every time slot is detected during a mutually same state for the second counter, which makes further data buffers, or further capacity to transmit information through the switching unit, except for what traditionally is required in a switching unit, unnecessary for a method according to the present invention.

Regular alarm signals from the continuous parity control is ignored during a control of an established wideband connection, in order to not generate alarm signals for parity errors from the labeled data bits.

The present invention also shows an arrangement adapted to work in accordance with a method according to the invention. Such arrangement is based on a previously described switching unit, where the switching unit comprises a central unit adapted to manage certain switching internal functions.

The invention specifically teaches that a first counter is related to respective input selector stage, which is adapted to count incoming data frames, and which cycles through a predetermined number of states, where one such state corresponds to a control state.

Respective input selector stage is also given a control labeling unit, which is adapted to label each and every time slot belonging to a wideband connection in question during a control state.

A second counter is related to respective output selector stage, which is adapted to count outgoing data frames, and which cycles through the same number of states as the first counter.

Respective output selector stage is also given a detecting unit, which is adapted to detect time slots that are labeled by the control labeling unit.

As a labeled time slot is detected, a first storing unit, belonging to the detecting unit, is adapted to store the state of the second counter, and a second storing unit, belonging to the detecting unit, is adapted to simultaneously store the output channel number of the detected labeled time slot.

The detecting unit also comprises a comparing unit, which is adapted to compare the output channel numbers of the labeled time slots with the intended output channel numbers for the wideband connection in question, and to compare the state of the second counter at detection of respective labeled time slot. The TSFI of the established wideband connection can be determined based on the results from these comparisons.

In the cases where respective input selector stage comprises a parity control generating unit, which is adapted to generate a parity bit for every time slot, corresponding to the content of respective time slot, according to a predetermined order, and where respective output selector stage comprises a parity controlling unit, which is adapted to control the parity of every outgoing time slot according to the accompanying parity bit and the predetermined order, the control labeling unit can be adapted to perform a labeling of a time slot by means of giving the information within the specific time slot a parity that deviates from the parity according to the predetermined order, such as reversed parity.

According to one proposed embodiment the present invention teaches that the detecting unit is adapted to only perform a detection of labeled time slots when the central unit requires a control, or that the central unit only acknowledges information from the detecting unit when a control of a wideband connection is required.

Respective control labeling unit is adapted to label one time slot per data frame and respective first and second storing unit is adapted to store the results from respective detection. The comparing unit is adapted to compare the results from respective control with one another, and the detecting unit is adapted to control that every time slot is detected during a mutually same state of the second counter, on the basis of the results from the comparing unit.

The central unit is adapted to ignore the regular alarm signals from the parity controlling unit during the control of an established wideband connection.

Input and output selector stages can be composed of time selector stages, and, as an example, a space selector stage can be adapted to work between the input and output selector stages, as in a TST structure.

ADVANTAGES

The main advantages of a method and/or arrangement according to the present invention is that hereby it is possible to perform a control of TSFI on an established wideband connection through a switching unit in a simple and cost-effective manner.

A valuable feature of the present invention is that there is no need to transport any extra information through the switching unit, such as sequence number or the like, in order to perform a control of TSFI.

One further advantage is that, according to the present invention, the first and second counters does not need to be synchronized with one another, which further simplifies the application of the present invention.

The primary characteristic features of an inventive method are set forth in the characterizing clause of the following claim 1, and the primary characteristic features of an inventive arrangement are set forth in the characterizing clause of the following claim 8.

BRIEF DESCRIPTION OF THE DRAWINGS

An embodiment of a method and arrangement at present preferred and having features significant to the present invention will now be described with reference to the accompanying drawings, in which.

DESCRIPTION OF EMBODIMENTS AT PRESENT PREFERRED

Figure 1:
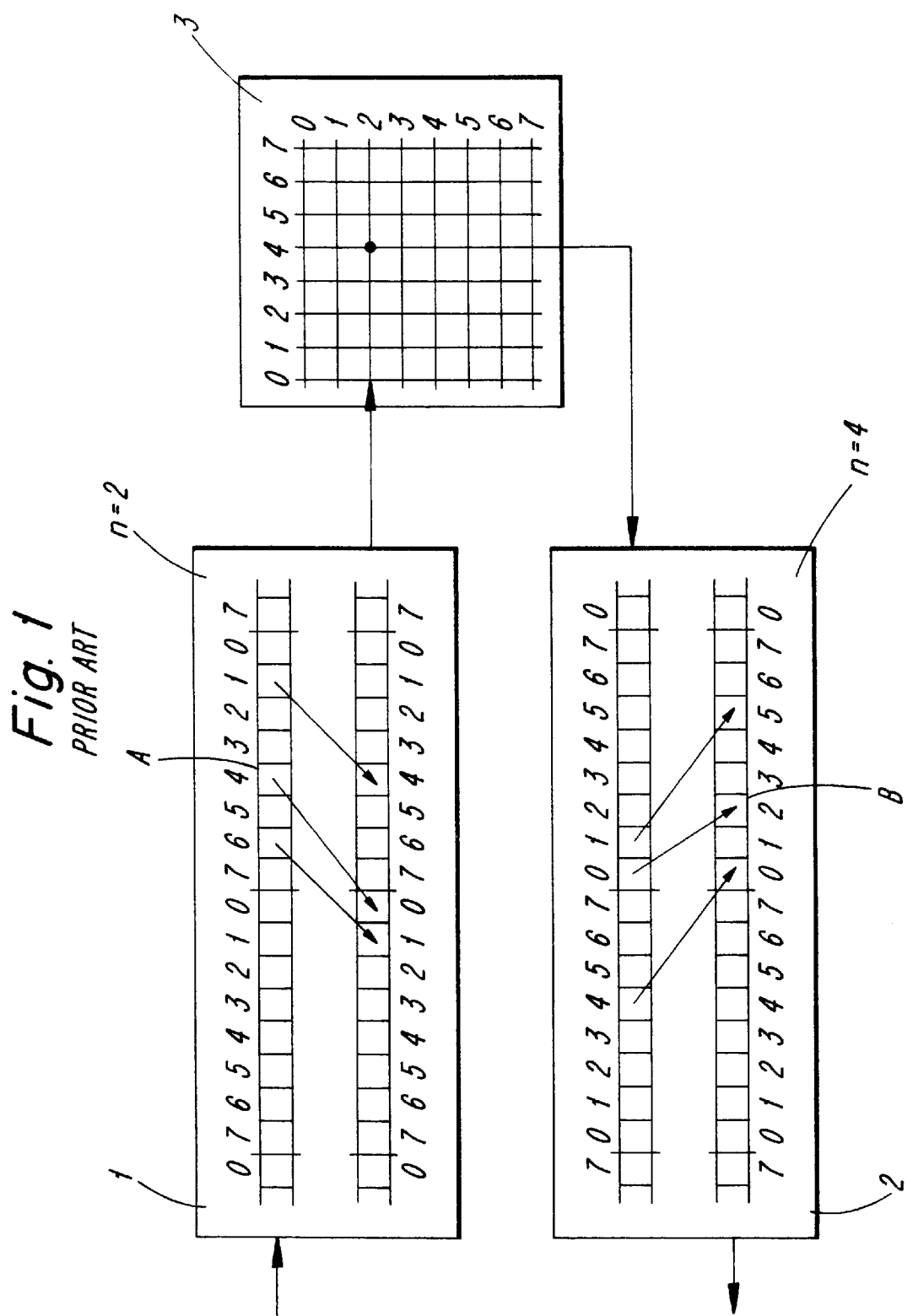
FIG. 1 shows schematically and in a very simplified manner a switching unit according to prior art.

A part of a switching unit, comprising a number of input selector stages and a number of output selector stages, is shown in FIG. 1.

It is here shown one of these input selector stages 1 and one of these output selector stages 2, of which both are connected to a selector core 3. An incoming channel, belonging to an arbitrary input selector stage can be connected to an arbitrary output channel, belonging to an arbitrary output selector stage, through the selector core.

The number of input and output selector stages varies between different switching units. The input selector stage shown in FIG. 1 constitutes selector stage n=2, and the output selector stage shown in FIG. 1 constitutes selector stage n=4.

In the Figure a switching unit with a TST-structure (Time Space Time) is shown, meaning that the input and output selector stages 1, 2 are time selector stages, and that the selector core 3 working there between is a space selector stage. This is only an exemplifying embodiment and it should be understood that nothing prevents the present invention to be used in connection with a switching unit of a different structure, such as TT, STS, TS, TSST or SSTSS. The most common structure is nevertheless the TST-structure, which is the reason for using this structure as an example in this description. It is obvious for a person skilled in the art how the present invention is to be adapted if it is to be used within a switching unit with a different structure.

The function of time- and space-selector stages is regarded as well known to a person skilled in the art, wherefore this will not be described in detail in the following description. Certain functions will be described in principle in order to simplify the understanding of the present invention.

Data or information intended to be transmitted from one subscriber to another is arriving to an input selector stage 1 in the form of digital data bits arranged into incoming time slots, which in turn are arranged into data frames.

FIG. 1 illustrates how one incoming time slot "A" corresponds to an incoming channel with a specific channel number "4".

Information transmitted from an output selector stage 2 constitutes accordingly digital data bits arranged into outgoing time slots, which in turn are arranged into data frames, where one outgoing time slot "B" corresponds to an outgoing channel with a channel specific channel number "2".

A connection between for instance channel "4" in the input selector stage n=2 with channel "2" in the output selector stage n=4 is performed by connecting data bits within time slot number "4", within incoming data framed to input selector stage n=2, to an internal time slot, for instance time slot number "0", through the time selector stage n=2.

Data bits within the internal time slot "0" is connected from input selector stage n=2 to output selector stage n=4 through the space selector stage.

The data bits within the internal time slot "0" are connected to the outgoing time slot "2" within the output selector stage n=4. In this way has a connection been established between the channel "4", belonging to the input selector stage n=2, and channel "2", belonging to the output selector stage n=4.

A wideband connection is a connection that uses two or more time slots within one data frame. With such connections it is important that incoming time slots belonging to a mutual wideband connection, and thus arrives to an input selector stage within a mutual data frame, also is transmitted from an intended output selector stage within a mutual data frame, which is what is called frame integrity or TSFI. The intention of the present invention is to provide a method and an arrangement whereby a control of an established wideband connection regarding TSFI can be provided in a simple manner.

FIG. 1 also illustrates what a wideband connection mat look like through a switching unit. Incoming data bits belonging to a wideband connection are stored within time slots numbers 1, 4 and 6, and are arriving to input selector stage n=2, and these are to be connected to outgoing time slots numbers 0, 2 and 5 from the output selector stage n=4.

The incoming time slots are switched over to the internal time slots numbers 4, 0 and 1 according to the Figure.

The internal time slots are switched over to the outgoing time slots 0, 2 and 5 after switching through to output selector stage n=4 through the switching core 3. The Figure shows that frame integrity has been achieved since time slots belonging to the wideband connection and arriving within a mutual data frame also are sent out in a mutual data frame.

This description of a time selector stage is very simplified, with the only purpose to describe the principle function of a time selector stage and what is meant by frame integrity.

The number of time slots within a data frame can be a lot bigger then eight in the practical application, it is usually 32 in a standardized PCM-protocol (Pulse Code Modulation), while the number of internal time slots within an internal data frame can for instance be 512 in order to thereby provide a larger number of selectable connections through the switching unit.

Thus is the internal bit rate through the switching unit higher then the bit rate for incoming and out going data frames, since an internal data frame with 512 time slots is to be transmitted during the same time period as an external data frame with 32 time slots.

The number of input selector stages and output selector stages can also be a lot larger than eight in most practical applications, which means that usually has the selector core a greater number of in- and outputs than what is described and shown in the Figure.

FIG. 1 is thus to be seen as a schematic simplified illustration of the coaction between input selector stages, output selector stages and the selector core in a TST-structure with the purpose of simplifying the understanding of the present invention.

The actual design of a switching unit in a practical application is not crucial for the function of the present invention and it is obvious for a person skilled in the art how the present invention is to be adapted to function within a practical application.

Figure 2:
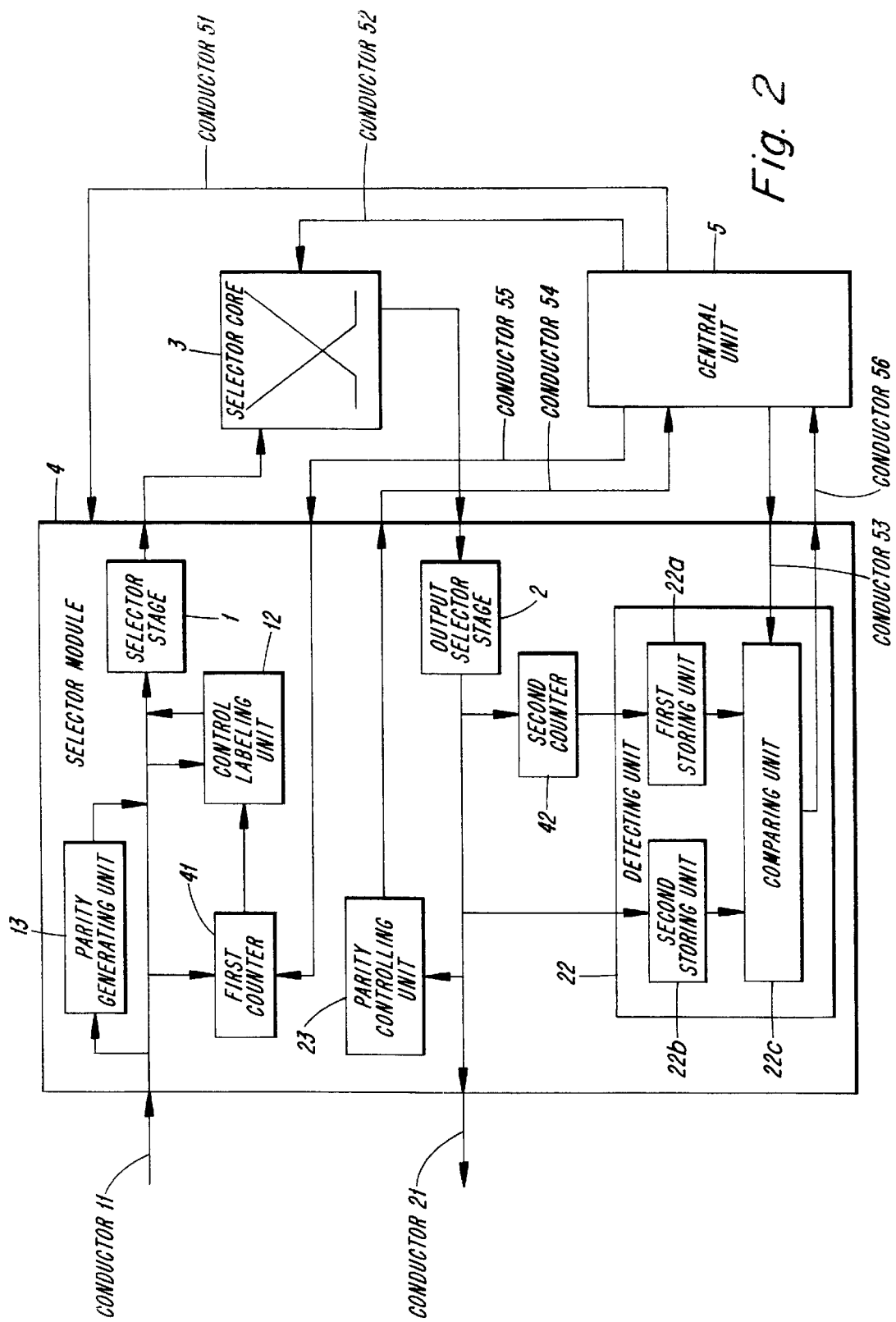
FIG. 2 shows schematically a switching unit according to the present invention.

FIG. 2 shows a selector module 4, comprising one input selector stage 1 and one output selector stage 2, both connected to the selector core 3.

The invention teaches specifically that incoming data frames, coming in to the input selector stage 1 through conductor 11, are counted by a first counter 41, which is related to the input selector stage 1.

This first counter 41 cycles through a predetermined number of states, where one state is a so called control state.

In this example the number if states is three and the first state is a control state. A control state is thus present at every third incoming data frame.

The method according to the invention teaches that every time slot belonging to the wideband connection to be controlled is given a label, and that this can only be done during a control state. This means that one of the time slots belonging to the wideband connection can be labeled at every third incoming data frame.

This is repeated until every time slot belonging to the wideband connection has been labeled at least once.

Data frames that are leaving an output selector stage, through conductor 21, are counted by a second counter 42, related to respective output selector stage 2.

Figure 3:
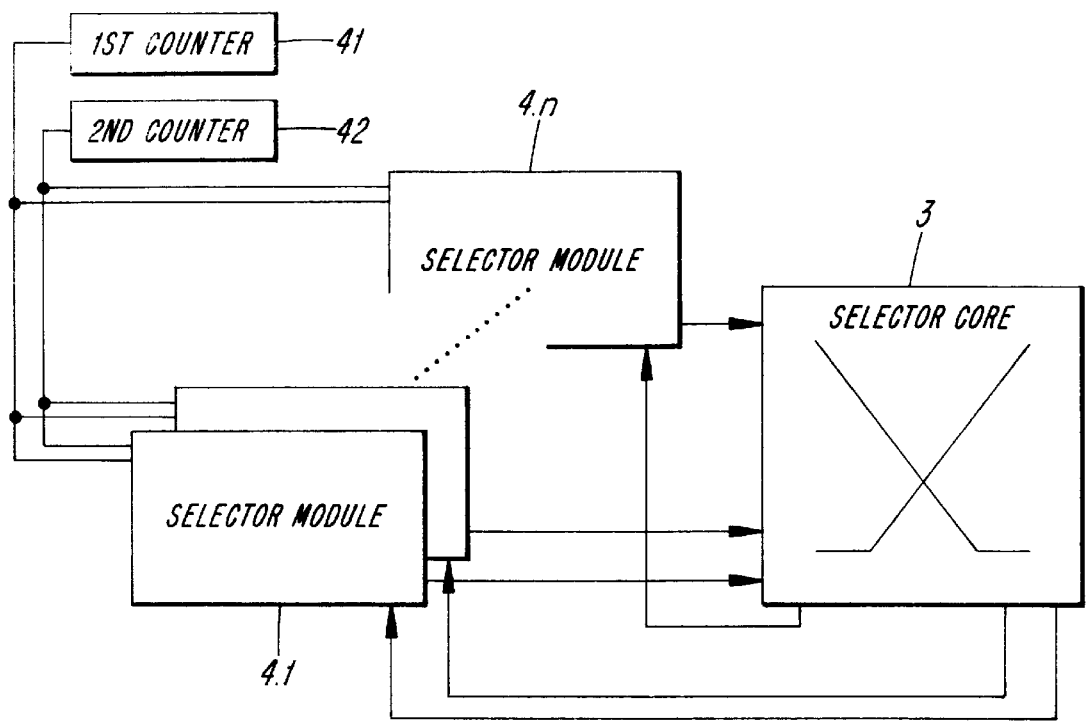
FIG. 3 shows an alternative embodiment of a switching unit according to the present invention.

The first and second counter are respectively physically positioned within the selector module 4, but nothing prevents that these counters 41, 42 are centrally positioned counters outside the selector module 4, as shown in FIG. 3, where a number of selector modules 4.1, . . . , 4.n are connected to the selector core 3.

There is also a possibility that the first and second counter 41, 42 respectively is a mutual counter for respective selector module, or a mutual centrally positioned counter. It is nevertheless a simplification to have separate counters as a first and second counter since it is not unusual that there is a time difference between incoming and outgoing data frames.

The second counter 42 cycles through the same number of states as the first counter 41. Time slots that have been labeled are detectable by a respective output selector stage 2, and the state of the second counter and the channel number of the labeled time slot is stored whenever a labeled time slot is detected.

The wideband connection in question is regarded as being correctly established through the switching unit if the labeled time slots belonging to the wideband connection are detected during the same state of the second counter and if the time slots belonging to other connections are unlabeled during the control procedure.

It does not matter during what state of the second counter 42 that the labeled tome slots are detected since the requirement is that the various time slots are to be detected during the same state of the second counter. Thus there is no need for any synchronization between the first and the second counter 41, 42.

It is not unusual the a transmission of time slots through a switching unit comprises a continuous parity control of the content of the transmitted time slots according to a predefined order.

Figure 4:
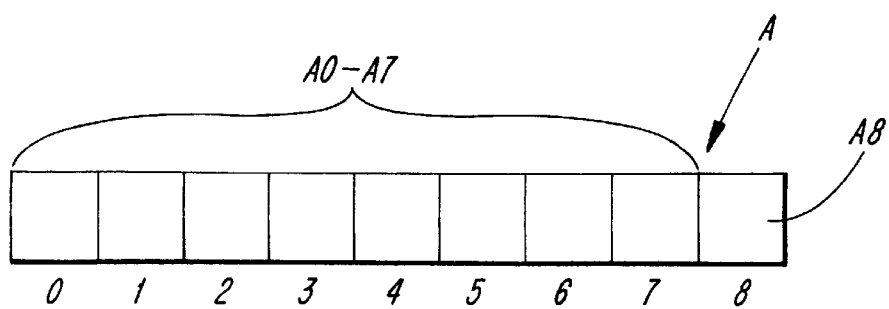
FIG. 4 shows a possible way of forming a time slot with a parity bit.

FIG. 4 scows schematically how a time slot "A" might be designed. The time slot "A" comprises eight bit positions A0–A7 wherein user data can be stored. The time slot also comprises a ninth bit position A8 wherein a parity bit can be stored.

In such switching unit it is fitting to label a time slot by giving the information within the time slot A0–A7 a parity A8 that differs from the parity according to the predetermined order. A simple and normal way of doing this is to give labeled time slots reversed parity.

The labeling of time slots through reversed parity makes it possible to transmit such label through the switching unit without making any extra use of the transmission capacity through the switching unit. A time slot with a reversed parity does not require any more space then a time slot with the correct parity.

The detection of labeled time slots is only carried out after a requested control of a wideband connection. It is also possible to adapt the central unit to only acknowledge information from the detecting unit when a control of a wideband connection is requested. Time slots that are detected with reversed parity when there is no wideband connection control requested are detected as faulty transmitted time slots, according to the continuous parity control within the switching unit.

Regular alarm signals from the continuous parity control are ignored during a control of an established wideband connection, since the label constitutes a faulty parity for the labeled time slots and thus would generate alarm signals for parity errors.

It is an advantage if a control state for the first counter is at hand as often as possible since the regular parity control is disabled during a control according to the present invention, and since the establishing of a wideband connection and the control of the same is to be performed as fast as possible. It is also important that a labeled time slot is detected before a control of the next channel is started. Thus must the distance between two control states correspond to at least the longest possible time lag for a time slot through the switching unit.

This means that the time that is required for the first and second counter to cycle through the number of possible states should correspond to the longest time it may take from the point in time where the information within a time slot is received in an input selector stage 1 to the point in time where it is transmitted from an output selector stage 2.

In the exemplifying embodiment according to the Figures, where the switching unit is of a TST-structure, this longest time is three data frames, which is the reason for setting the number of states for the first and second counter 41, 42 to three.

It is suitable to perform a control of a wideband connection for one time slot per data frame, where the result from respective control is compared with one another to control that every time slot is detected during a mutually same state for the second counter 42.

An arrangement adapted to work in accordance with a method according to the invention will be described in ore detail in the following.

Such arrangement can be based on a switching unit described in FIG. 2.

FIG. 2 also shows a central unit 5 which is adapted to calculate and request an establishment of requested connections through the switching unit, where an incoming channel number, belonging to a specific input selector stage 1, is intended to be connected to an output channel number, belonging to a specific output selector stage 2. The intention of the arrangement is also to control that the calculated intended connection also is realized in the practical application.

The central unit 5 is directly or indirectly connected to respective selector module 4 through a conductor 51 and to the selector core 3 through a conductor 52.

It is shown in the Figure that respective input selector stage 1 is given a control labeling unit 12, and that respective output selector stage 2 is given a detecting unit 22, which is adapted to detect time slots that are labeled by the control labeling unit 12.

As a labeled time slot is detected, a first storing unit 22a, belonging to the detecting unit 22, is adapted to store the state of the second counter 42, and a second storing unit 22b, belonging to the detecting unit 22, is adapted to simultaneously store the output channel number of the detected labeled time slot. The storing units 22a, 22b are thus to be able to store the state of the second counter 42 and the channel number for every channel belonging to the wideband connection.

The detecting unit 22 also comprises a comparing unit 22c, which is adapted to compare the output channel numbers of the labeled time slots with the intended calculated output channel numbers for the wideband connection. The information regarding the calculated output channel number is received from the central unit 5 through conductor 53. The comparing unit also compares the state of the second counter at detection of respective labeled time slot.

FIG. 2 also shows that respective input selector stage 1 comprises a parity generating unit 13, which is adapted to generate a parity bit A8 for every time slot "A", corresponding to the content of respective time slot A0–A7, according to a predetermined order. Respective output selector stage 2 comprises a parity controlling unit 23, which is adapted to control the parity of every outgoing time slot according to the accompanying parity bit A8 and according to the predetermined order. The result of the parity control is sent to the central unit 5 through conductor 54.

The control labeling unit 12 is adapted to perform a labeling of a time slot by means of giving the information A0–A7 within the specific time slot "A" a parity A8 that deviates from the parity according to the predetermined order, such as reversed parity.

The central unit 5 is adapted to require a control of an established wideband connection through a conductor 44 and the detecting unit 22 is adapted to only perform a detection of labeled time slots at such a request. This is done at the establishing of a wideband connection, but it can also be done for since long established connections, for instance as part of the maintenance of permanent connections.

The control labeling unit 12 is adapted to label one time slot per data frame, meaning that a control of an established wideband connection requires a certain minimum time. This time corresponds to the number of channels within the connection multiplied with the number of states for the first counter 41. The control can be performed with test or dummy data or with user data within the time slots, all according to what security that is required from the connection before it is used.

The first and second storing unit 22a, 22b is adapted to store the results from respective detection, whereafter the comparing unit 22c is adapted to compare the results from respective control with one another. The detecting unit 22 controls thereafter that every time slot is detected during a same state of the second counter 42, on the basis of the results from the comparing unit 22c. The result from the control is sent to the central unit 5 through the conductor 56.

The central unit 5 is adapted to ignore the regular alarm signals from the parity controlling unit 23 during a requested control of an established wideband connection.

It will be understood that the invention is not restricted to the illustrated exemplifying embodiments thereof and that modifications can be made within the scope of the inventive thought as illustrated in the following claims.

What is claimed is:

1. A method to control an established wideband connection through a switching unit, the switching unit comprising at least one input selector stage and at least one output selector stage, where the information coming into an input selector stage is represented by digital databits, arranged into incoming time slots within data frames, where an incoming time slot corresponds to an incoming channel with a specific channel number, and where outgoing information from an output selector stage is represented by digital databits, arranged into outgoing time slots within data frames, where an outgoing time slot corresponds to an outgoing channel with a specific channel number, and where said wideband connection holds two or more time slots within one data frame, the method comprising the steps of:

counting said incoming data frames by a first counter related to said input selector stage;

cycling said first counter through a predetermined number of states, of which one state constitutes a control state;

labeling each time slot belonging to said wideband connection during one of said control states;

counting said outgoing data frames by a second counter, related to said output selector stage;

cycling said second counter through the same number of states as said first counter;

detecting time slots that have been labeled by said output selector stage;

storing the state of said second counter and the outgoing channel number of said labeled time slot as a labeled time slot is detected;

wherein said wideband connection is regarded as correctly established through said switching unit if the labeled time slots belonging to said wideband connection are detected during the same state for said second counter, and if time slots belonging to other connections than said wideband connection are unlabeled during the control.

2. The method according to claim 1, where the transmission of information through said switching unit comprises a continuous parity control of the content of transmitted time slots according to a predetermined order, wherein the step of said labeling of a time slot further comprises that the information within said time slot is given a parity that differs from the parity according to said predetermined order.

3. The method according to claim 1, wherein said detection of labeled time slots is only performed at a requested control of an established wideband connection.

4. The method according to claim 1, wherein the time required for said first and second counter to cycle through the number of possible states corresponds to at least the longest possible time that can be required from the point in time where a data frame is received in an input selector stage to the point in time where it is transmitted from an output selector stage.

5. The method according to claim 1, wherein said control is performed for one time slot per data frame, and that the results from respective control are compared with one another in order to control that every time slot is detected during a mutually same state for said second counter.

6. The method according to claim 2, wherein regular alarm signals from the continuous parity control are ignored during control of an established wideband connection.

7. The method according to claim 1, wherein said input and output selector stages consists of time selector stages and that one space selector stage is working between said input and output selector stages.

8. The method according to claim 3, wherein regular alarm signals from the continuous parity control are ignored during control of an established wideband connection.

9. An arrangement adapted to control an established wideband connection through a switching unit, in which the switching unit comprises at least one input selector stage and at least one output selector stage, and one central unit, where the information coming into an input selector stage is represented by digital databits, arranged into incoming time slots within data frames, where an incoming time slot corresponds to an incoming channel with a specific channel number, and where outgoing information from an output selector stage is represented by digital databits, arranged into outgoing time slots within data frames, where an outgoing time slot corresponds to an outgoing channel with a specific channel number, and where said wideband connection holds two or more time slots within one data frame, and where said central unit is adapted to calculate and request an establishment of requested connections through said switching unit, where an incoming channel number, belonging to a specific input selector stage, is intended to be connected to an output channel number, belonging to a specific output selector stage, for said wideband connection, the arrangement comprising:

a first counter related to a respective input selector stage, and for counting incoming data frames, said first counter cycling through a predetermined number of states, where one state corresponds to a control state;

a respective input selector stage including a control labeling unit, said control labeling unit labeling each and every time slot belonging to said wideband connection during said control state;

a second counter related to a respective output selector stage, for counting outgoing data frames, said second counter cycling through the same number of states as said first counter;

said respective output selector stage including a detecting unit, said detecting unit detecting time slots that are labeled by said control labeling unit, wherein as a labeled time slot is detected, a first storing unit, belonging to said detecting unit, stores the state of said second counter, and that a second storing unit, belonging to said detecting unit, stores the output channel number of said detected labeled time slot, and said detecting unit comprises a comparing unit for comparing the output channel numbers of said labeled time slots with intended output channel numbers for said wideband connection, and for comparing the state of said second counter at detection of respective labeled time slot.

10. An arrangement according to claim 9, wherein said input selector stage comprises a parity generating unit for generating a parity bit for every time slot, corresponding to the content of a respective time slot, according to a predetermined order, and where a respective output selector stage comprises a parity controlling unit for controlling the parity of every outgoing time slot according to the accompanying parity bit and the predetermined order, said control labeling unit performing a labeling of a time slot by means of giving the information within said time slot a parity that deviates from the parity according to the predetermined order.

11. An arrangement according to claim 9, wherein said detecting unit only performs a detection of labeled time slots when the central unit requires control of an established wideband connection.

12. An arrangement according to claim 9, wherein the time required for said first and second counter to cycle through the number of possible states corresponds to at least the longest possible time that can be required from the point in time where a data frame is received in an input selector stage to the point in time where it is transmitted from an output selector stage.

13. An arrangement according to claim 9, wherein said control labeling unit labels one time slot per data frame, said first and second storing unit stores the results from respective detection, said comparing unit compares the results from respective control with one another, and said detecting unit controls that every time slot is detected during a mutually same state of said second counter, on the basis of the results from said comparing unit.

14. An arrangement according to claim 10, wherein said central unit is adapted to ignore regular alarm signals from said parity controlling unit during a control of an established wideband connection.

15. An arrangement according to claim 9, wherein said input and output selector stages are composed of time selector stages, and that a space selector stage works between said input and output selector stages.

16. An arrangement according to claim 10, wherein said central unit ignores regular alarm signals from said parity controlling unit during a control of an established wideband connection.

17. An arrangement for controlling an established wideband connection through a switching unit comprising:
- a first counter for counting data frames coming into switching unit, where said first counter cycles through a predetermined number of states including one control state;
- a second counter for counting data frames leaving the switching unit, where said second counter cycles through said predetermined number of states;
- a unit for giving a control mark to each time slot belonging to the wideband connection to be tested during said control state;
- a detector for detecting control marked time slots;
- a unit for storing the state of the second counter and an output channel number when a control marked time slot is detected, wherein the wideband connection to be tested is determined to be correctly established through the switching unit if the time slots belonging to the wideband connection are all detected during a mutually same state of the second counter.

18. The method according to claim 2, wherein said detection of labeled time slots is only performed at a requested control of an established wideband connection.

* * * * *